US006639236B1

(12) United States Patent
Low et al.

(10) Patent No.: US 6,639,236 B1

(45) Date of Patent: Oct. 28, 2003

(54) RADIOACTIVE MATERIAL CONTAINER

(75) Inventors: Colin Mark Low, Reading (GB); Graham John Erskine, Reading (GB); Roy Paul Awbery, Reading (GB); Martyn Charles Allen, Reading (GB)

(73) Assignee: The Secretary of State for Defence (GB)

( * ) Notice: Subject to any disclaimer, the term of this patent is extended or adjusted under 35 U.S.C. 154(b) by 0 days.

(21) Appl. No.: 09/980,574

(22) PCT Filed: May 12, 2000

(86) PCT No.: PCT/GB00/01831

§ 371 (c)(1),
(2), (4) Date: Feb. 28, 2002

(87) PCT Pub. No.: WO00/70624

PCT Pub. Date: Nov. 23, 2000

(30) Foreign Application Priority Data

May 13, 1999 (GB) .............................................. 9910998

(51) Int. Cl.[7] .................................................. H02L 5/00

(52) U.S. Cl. ............................... 250/506.1; 250/507.1; 312/249.8; 376/272; 376/250; 376/269; 376/287; 600/7; 600/3; 128/1.2; 128/1.1

(58) Field of Search ........................... 250/506.1, 507.1; 312/249.8; 376/272, 250, 269, 287; 600/7, 3; 128/1.2, 1.1

(56) References Cited

U.S. PATENT DOCUMENTS

| | | | | |
|---|---|---|---|---|
| 5,734,169 A | * | 3/1998 | Saidian | 250/506.1 |
| 5,748,692 A | * | 5/1998 | Burton | 376/272 |
| 5,949,084 A | * | 9/1999 | Schwartz | 250/506.1 |

FOREIGN PATENT DOCUMENTS

| | | |
|---|---|---|
| WO | WO 96/36972 | 5/1996 |

* cited by examiner

*Primary Examiner*—John R. Lee
*Assistant Examiner*—Zia R. Hashmi
(74) *Attorney, Agent, or Firm*—Dean W. Russell; Kilpatrick Stockton LLP

(57) ABSTRACT

A shielded rack loader makes use of a loading rack movable between a shielding structure and a storage tube. A shield plug seals the storage tube. A hoist moves the shield plug and the loading rack. A shield plug cart and a material transfer cart mate with receiving flanges of the rack loader and permit temporary storage and movement of the shield plug and of canisters of transuranic material.

14 Claims, 2 Drawing Sheets

RADIOACTIVE MATERIAL CONTAINER

Figure 1:
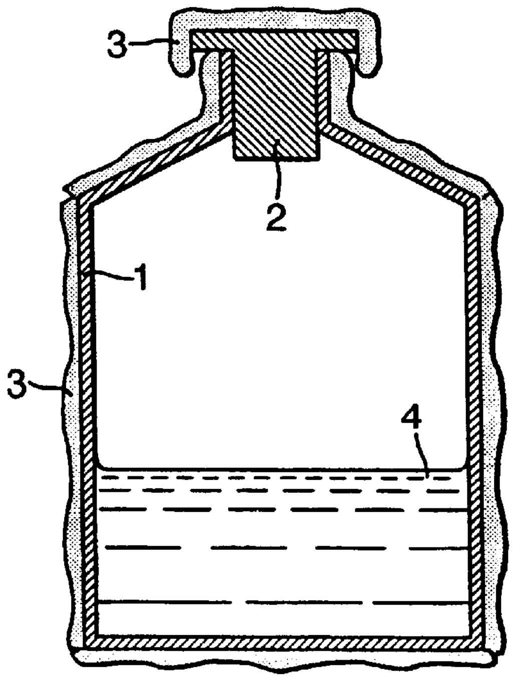

This application claims priority to Great Britain Application No. 9910998.5 filed on May 13, 1999 and International Application No. PCT/GB00/01831 filed on May 12, 2000 and published in English as International Publication Number WO 00/70624 on Nov. 23, 2000.

This invention relates to a radioactive material container.

In order to prevent radiation escaping from a receptacle containing a radioactive material, it is usual to wrap lead sheeting around the receptacle. This is then followed by binding the lead wrapped receptacle with adhesive plastic tape. This has the inherent disadvantages of making the receptacle heavy, bulky and difficult to handle and is susceptible to leaving gaps in the shielding through which radiation can escape. If the radioactive material is a liquid, then the conventional lead casing will not prevent the liquid from escaping from the receptacle/casing ensemble in the event that the receptacle should fail or break.

In accordance with the present invention a radioactive material container comprises a receptacle characterised in that a coating of lead and a further resilient layer cover a substantial proportion of the receptacle's exterior surface the lead being deposited by an electroplating process.

The lead may be directly coated on the surface of the receptacle. Coating of a sufficient surface area of the receptacle provides for the mitigation of escape of radiation from the container. The electroplating process provides for simple deposition of the required thickness of lead, which is adequately uniform across the surface area of the receptacle. This reduces the weight of the container, which is also consequently easier to handle. The lead may absorb some of the energy of any impulse that is experienced by the container (for example, if the container is dropped), thus decreasing the likelihood of breakage of the receptacle. However its primary function is to prevent or reduce to safe levels transmission of radiation outside of the container.

The lead has a mean thickness in the range 0.01–6 mm, with a preferred mean thickness of 1 to 6 mm. Most preferably the lead thickness is between 1 mm to 2 mm. This provides a sensible degree of protection whilst being reasonably easy to apply and adhere to the receptacle. Furthermore, this is sufficient to provide protection for the user of the container, while retaining lightness and ease of use.

In one embodiment, the receptacle is made of a plastics material. Plastics receptacles are lightweight, readily available and cheap. The plastics material is preferably chosen from one of high density poly(ethylene), poly(propylene), poly(methylpentene) and poly(tetrafluoroethylene).

In another embodiment, the receptacle is made of glass. This material is very strong and does not usually degrade when subjected to radiation.

In a further embodiment, the receptacle is made of a metal. Metals are generally strong, yet tough The metal is preferably aluminium, since this is lightweight.

The resilient layer is especially useful if the receptacle may be damaged by impact or other shock which might result in mechanical breakage of the receptacle and allow leakage of any materials contained therein. Such a layer is particularly advisable where the receptacle is made from glass or a similar fragile material which is easily shattered on impact. By applying a resilient layer the breakage can be prevented or any leakage postponed or reduced by the resilient layer. The resilient layer is preferably applied over the lead. The material of the resilient layer is preferably an epoxy resin. This forms a hard durable and slightly flexible protective barrier which contains the receptacle contents should the receptacle and the lead layer fail. A further advantage of using epoxy resin is its tendency to expand on contact with some radioactive materials thus acting as a warning if the integrity of the receptacle has been breached. This provides a period within which the material is still contained and enables remedial action to be taken for example, transfer to another container. Materials other than epoxy resin suitable for use in the invention will be apparent to those skilled in the art.

In one embodiment, in addition to the lead coating there is at least one further coating of cadmium and one further coating of copper both of which cover a substantial proportion of the exterior surface of the receptacle or the lead. Preferably the receptacle is first coated with at least one layer of cadmium and a layer of copper before the lead is applied. The cadmium and copper layers mitigate the egress of any X-rays. Preferably at least one additional layer of cadmium and an additional layer of copper is provided on top of the lead layer. This forms a sandwich with the lead in the middle. A resilient layer is then provided on top.

In one arrangement of the invention, a substantial proportion or the whole of the exterior surface of the receptacle or lead coating is coated with cadmium and copper layers.

In one embodiment, the cadmium and copper are deposited by an electroplating process, thus enabling all of the coating to be facilitated by electroplating. The electroplated cadmium and copper layers, may have a total range of thickness of between 0.01 and 1 mm.

The receptacle is chosen from one of a syringe, a bottle, a box or a canister.

Figure 2:
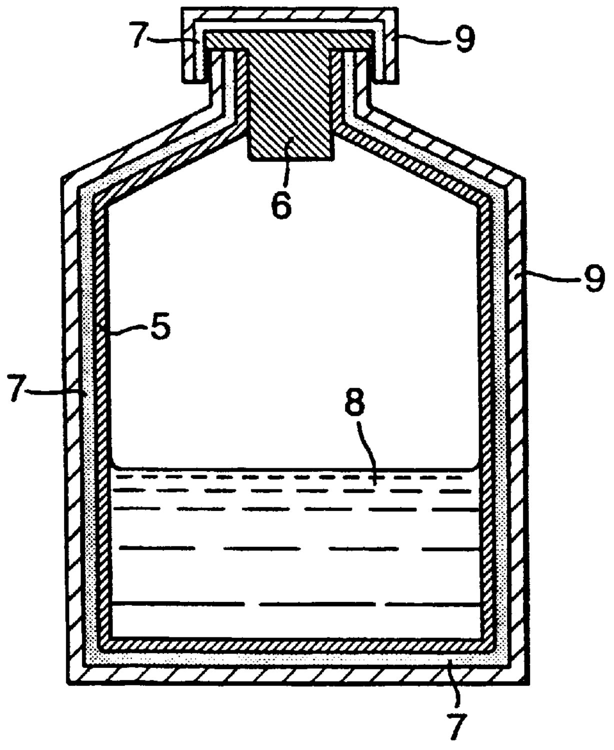
Figure 3:
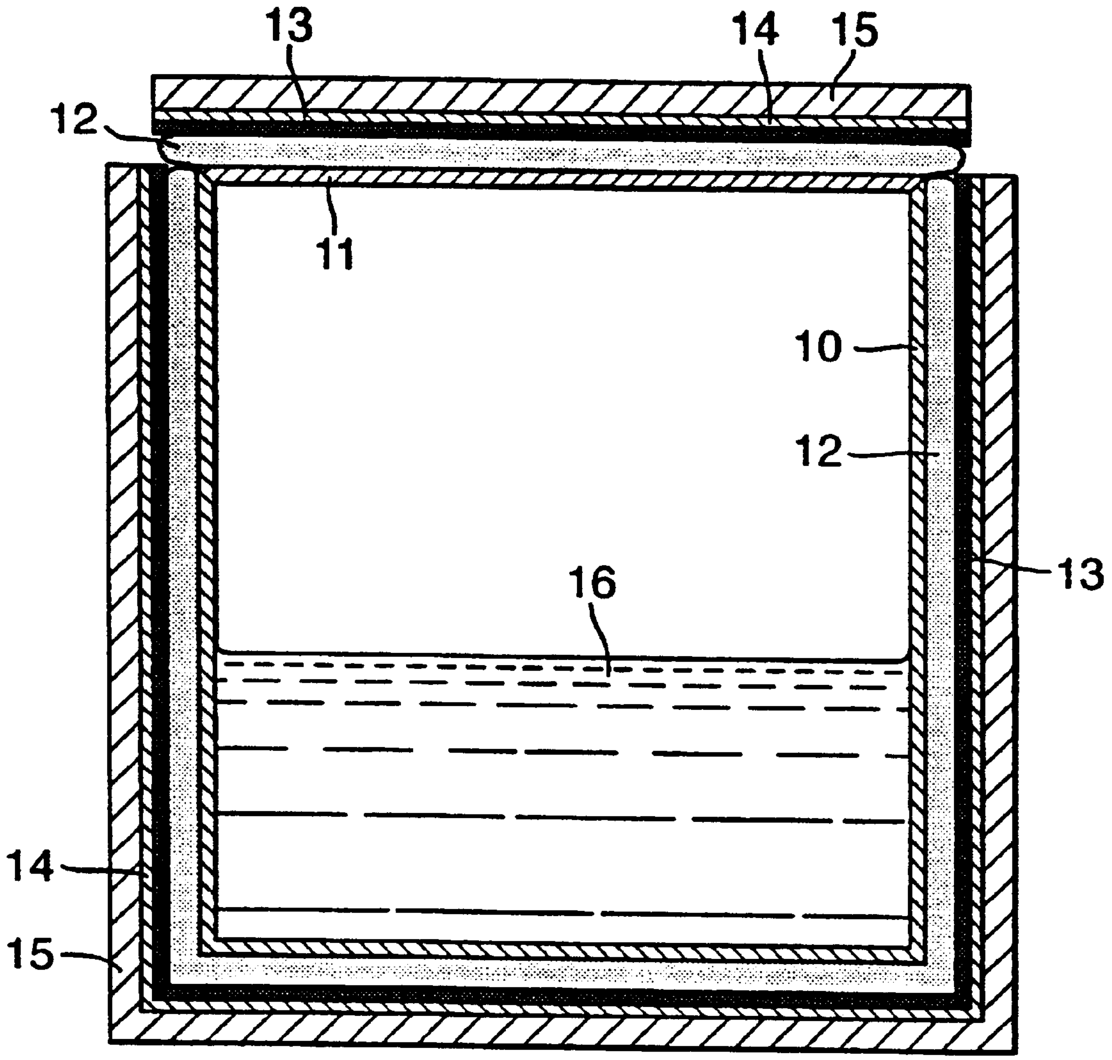

An example of a radioactive material container in accordance with the present invention will now be described with reference to the accompanying drawings of which:

FIG. 1 is a schematic cross-sectional view of a conventional radioactive material container in which a radioactive material has been placed;

FIG. 2 is a schematic cross-sectional view of a radioactive material container in accordance with the present invention in which a radioactive material has been placed; and, FIG. 3 is a schematic cross-sectional view of a radioactive material container in accordance with the present invention, with a coating of cadmium and copper on the exterior surface of the lead coating, in which a radioactive material has been placed.

FIG. 1 shows an example of a conventional radioactive material container comprising a plastic bottle 1, a bottle cap 2 and a antimonial lead shield 3. The bottle is partially filled with a radioactive liquid 4, for example, a crown ether complexed with a radioactive metal e.g. uranium. The lead shield 3 is made from antimonial lead sheeting which is crudely moulded around the bottle 1 and cap 2. The antimonial lead shield 3 absorbs a significant proportion of the ionising radiation that is emitted from the radioactive liquid 4. Hence, the amount of radiation that is transferred to the external environment is much reduced. Certain components of the radiation emitted by the radioactive liquid 4 (for example, alpha particles) will, however, cause the plastic bottle 1 to degrade. For example, exposure to β radiation can make some plastics very brittle. The bottle 1 may eventually degrade to the extent that it will totally fail or break, with the consequence that the liquid 4 will leak through to the antimonial lead shield 3. Since the shield 3 is made from sheets, there may be gaps in the shield through which the radioactive liquid 4 can leak. The gaps may also allow the unwanted egress of radiation.

The radioactive material container of the present invention addresses these problems by encasing the receptacle in a continuous, yet relatively thin layer of lead, the layer of lead being coated onto the surface of the receptacle.

A container in accordance with the present invention is shown in FIG. 2, which comprises a plastic receptacle, in this case a conventional solvent bottle 5 and cap 6 (both of which are made from high density polyethylene) and a layer of lead 7 deposited by an electroplating process on to the exterior surface of the bottle 5 and cap 6. The bottle 5 could be made from any plastics material suitable for the containment of radioactive material, the choice being affected, inter alia, by the chemical nature of the material contained therein. The layer of lead 7 is typically 2–5 mm thick and is continuous over each of the bottle 5 and the cap 6 i.e. it totally encases the main body of the bottle 5 and the external surface of the cap 6. The layer of lead 7 may extend beyond the edge of the cap 6 so that there is no interface region between the bottle 5 and cap 6 through which a significant amount of radiation can be emitted from the container. The bottle 5 is shown partially filled with a radioactive liquid 8, such as a crown ether which has been complexed with a radioactive metal e.g. uranium.

The continuous layer of lead 7 will minimise radiation egress from the bottle 5. There are no breaks or gaps in the lead through which significant amounts of radiation should leak.

The layer of lead 7 is deposited by electroplating onto the exterior surface of the bottle 5. A container according to the present invention will be less bulky than that shown in FIG. 1 since the layer of lead 7 is directly deposited onto the exterior surface of the bottle 5 and hence follows the contours and shape of the bottle 5, whereas, in a conventional container (FIG. 1), the lead shield 3 is manually formed around or moulded crudely onto the bottle 1.

The probability of the bottle 5 breaking in the container according to the invention will be slightly decreased when compared with a bottle used as a conventional container. A further layer 9 of an epoxy resin is applied as a coating on top of the entire layer of lead 7 to ensure that no liquid 8 will escape from bottle 5 even if this were to break or fail. This is important if the bottle 5 becomes brittle due to irradiation or if the bottle 5 is made from a fragile material such as glass.

Another example of a container in accordance with the present invention is shown in FIG. 3, which comprises an aluminium receptacle, in this case a canister 10 and lid 11. A layer of lead 12 is deposited by an electroplating process on to the exterior surface of the canister 10 and lid 11. A layer of cadmium 13 is deposited by an electroplating process on to the exterior surface of the layer of lead 12. The layer of lead 12 is typically 2–5 mm thick, but may be in the range 0.01–6 mm, and is continuous over each of the canister 10 and the lid 11 i.e. it totally encases the main body of the canister 10 and the external surface of the lid 11. A layer of copper 14 is deposited by an electroplating process upon the layer of cadmium 13. This reduces or eliminates emissions of Beta radiation through the canister 10 and lid 11. The layer of lead 12 may extend beyond the edge of the lid 11 so that there is no interface region between the canister 10 and lid 11 through which a significant amount of radiation can be emitted from the container. The canister 10 is shown partially filled with a radioactive liquid 16.

The layer of cadmium 13 is in the range of 0.01–1 mm thick and is continuous over the layer of lead 12 that coats each of the canister 10 and the lid 11 i.e. it totally encases the main body of the canister 10 and the external surface of the lid 11. As with the layer of lead 12, the layer of cadmium 13 may extend beyond the edge of the lid 11 so that there is no interface region between the canister 10 and lid 11 through which a significant amount of radiation can be emitted from the container. The continuous layer of cadmium 13 reduces the egress of fast neutrons through the canister 10 and lid 11. The layer of copper 14 is in the range of 0.01–1 mm thick and is continuous over the layer of cadmium 13 that coats each of the canister 10 and the lid 11 i.e. it totally encases the main body of the canister 10 and the external surface of the lid 11. As with the layer of cadmium 13 the layer of copper 14 may extend beyond the edge of the lid 11 so that there is no interface region between the canister 10 and lid 11 through which a significant amount of radiation can be emitted from the container. The continuous layer of copper 14 reduces the egress of fast neutrons through the canister 10 and lid 11. The canister 10 and lid 11 are covered by an epoxy resin layer 15 which acts to prevent failure of the canister 10 or lid 11 or restrict the outflow of any contents in the event of any failure because of impact.

What is claimed is:

1. A radioactive material container comprising a receptacle having an exterior surface and comprising:

a. a lead coating electroplated onto at least a portion of the exterior surface, the lead coating having a mean thickness in the range 0.01–6 mm; and b. a further resilient layer covering at least a portion of the exterior surface or the lead coating.

2. A radioactive material container according to claim 1 in which the mean thickness of the lead coating is approximately 1–2 mm.

3. A radioactive material container according to claim 1 characterised in that the receptacle is made from metal, glass or a plastics material.

4. A radioactive material container according to claim 3 characterised in that the receptacle is made from any one of high density poly(ethylene), poly(propylene), poly (methylpentene), poly(tetrafloroethylene) or aluminium.

5. A radioactive material container as claimed in claim 1 characterised in that there is provided at least one further coating of cadmium (13) and one further coating of copper (14) both of which cover a substantial proportion of the exterior surface of the receptacle or the lead.

6. A radioactive material container according to claim 5 characterised in that the cadmium and/or copper is deposited by an electroplating process.

7. A radioactive material container according to claim 5 characterised in that the cadmium and/or copper have a thickness in the range 0.01–1.0 mm.

8. A radioactive material container according to claim 1 characterised in that the resilient layer is formed from epoxy resin.

9. A radioactive material container according to claim 2 characterised in that the receptacle is made from metal, glass or a plastics material.

10. A radioactive material container as claimed in claim 2 characterised in that there is provided at least one further coating of cadmium (13) and one further coating of copper (14) both of which cover a substantial proportion of the exterior surface of the receptacle or the lead.

11. A radioactive material container as claimed in claim 3 characterised in that there is provided at least one further coating of cadmium (13) and one further coating of copper (14) both of which cover a substantial proportion of the exterior surface of the receptacle or the lead.

12. A radioactive material container as claimed in claim 4 characterised in that there is provided at least one further coating of cadmium (13) and one further coating of copper (14) both of which cover a substantial proportion of the exterior surface of the receptacle or the lead.

13. A radioactive material container according to claim 6 characterised in that the cadmium and/or copper have a thickness in the range 0.01–1 mm.

14. A radioactive material container according to claim 1 in which the further resilient layer covers at least a portion of the lead coating.

* * * * *